(12) United States Patent
Chiba et al.

(10) Patent No.: US 10,411,617 B2
(45) Date of Patent: Sep. 10, 2019

(54) DIELECTRIC ELASTOMER MOTOR

(71) Applicants: Seiki Chiba, Tokyo (JP); Mikio Waki, Sakura (JP); KUREHA ELASTOMER CO., LTD., Osaka-shi, Osaka (JP)

(72) Inventors: Seiki Chiba, Tokyo (JP); Mikio Waki, Sakura (JP); Yoshinori Tanaka, Kyoto (JP); Kuniyoshi Okamoto, Kyoto (JP); Kazuya Nagase, Kyoto (JP); Naoaki Tsurumi, Kyoto (JP); Syo Kurita, Tsu (JP); Makoto Takasugi, Tsu (JP); Nobuhiro Miyagi, Osaka (JP)

(73) Assignees: Seiki Chiba, Tokyo (JP); Mikio Waki, Sakura-shi; KUREHA ELASTOMER CO., LTD., Osaka (JP)

( * ) Notice: Subject to any disclaimer, the term of this patent is extended or adjusted under 35 U.S.C. 154(b) by 408 days.

(21) Appl. No.: 15/405,407

(22) Filed: Jan. 13, 2017

(65) Prior Publication Data
US 2018/0115260 A1 Apr. 26, 2018

(30) Foreign Application Priority Data
Jan. 13, 2016 (JP) ................................ 2016-004129

(51) Int. Cl.
*H02N 2/04* (2006.01)
(52) U.S. Cl.
CPC .................................. *H02N 2/046* (2013.01)
(58) Field of Classification Search
CPC . H02N 2/046; H02N 2/04; H02N 2/02; H01L 41/193

USPC .................................................. 310/328, 800
See application file for complete search history.

(56) References Cited

U.S. PATENT DOCUMENTS

| | | | | |
|---|---|---|---|---|
| 5,068,565 | A * | 11/1991 | Huang | H02N 2/105 310/328 |
| 6,655,035 | B2 * | 12/2003 | Ghandi | H02N 2/18 310/311 |
| 7,119,478 | B1 * | 10/2006 | Mentesana | H02N 2/021 310/328 |

(Continued)

FOREIGN PATENT DOCUMENTS

| | | | |
|---|---|---|---|
| JP | 4695226 B1 | 6/2011 | |
| JP | 4837794 B1 | 12/2011 | |

(Continued)

*Primary Examiner* — Derek J Rosenau
(74) *Attorney, Agent, or Firm* — Hamre, Schumann, Mueller & Larson, P.C.

(57) ABSTRACT

A dielectric elastomer motor includes an artificial muscle and a conversion mechanism cooperating with the artificial muscle. The artificial muscle includes a dielectric elastomer film or layer having a first surface and a second surface opposite to the first surface. First and second electrodes are attached to the first surface and the second surface of the dielectric elastomer film, respectively. First and second bases are attached to the dielectric elastomer so as to be spaced apart from each other. The first base and the second base are capable of reciprocation relative to each other upon change in size of the dielectric elastomer. The conversion mechanism converts the reciprocation of the bases to pivotal or rotational movement. The dielectric elastomer receives voltage application with a predetermined timing via the first and the second electrodes.

14 Claims, 13 Drawing Sheets

(56) References Cited

U.S. PATENT DOCUMENTS

2007/0200468 A1* 8/2007 Heim ................ F04B 43/0054
310/311

FOREIGN PATENT DOCUMENTS

| JP | 2014-507930 A | 3/2014 |
| JP | 2014-531188 A | 11/2014 |

* cited by examiner

DIELECTRIC ELASTOMER MOTOR

BACKGROUND OF THE INVENTION

1. Field of the Invention

The present invention generally relates to a dielectric elastomer motor, and in particular to a dielectric elastomer motor that utilizes, as a driving force, the elongation and deformation of an artificial muscle provided by a dielectric elastomer.

2. Description of the Related Art

To reduce the thickness of mobile devices such as laptops, the components incorporated therein need to be made thin. Along this line, for instance, flat motors have been proposed for driving a hard disk in a laptop. However, with further size reduction being desired, the motor to be incorporated is expected to be much thinner.

In recent years, more and more efforts have been made toward research on an actuator utilizing a dielectric elastomer. When voltage is applied to two electrodes sandwiching a layer of dielectric elastomer, one electrode stores positive charge, and the opposite electrode stores negative charge. This generates a pulling force between the electrodes to press the dielectric elastomer. Accordingly, the dielectric elastomer expands to be elongated in a longitudinal direction vertical to the plane of the electrodes. The force resulting from this elongation is used as the drive force of the actuator.

Various techniques regarding dielectric elastomer actuators are publicly known. Such techniques are disclosed in JP-B-4695226 and JP-B-4837794, for example.

Techniques of using these dielectric elastomers to obtain rotational power have also been developed. For example, JP-A-2014-507930 and JP-A-2014-531188 disclose such techniques. The conventional devices disclosed in these documents include at least one layer of dielectric elastomer, and first and second electrodes sandwiching the elastomer layer. The dielectric elastomer is linearly elongated by the application of voltage, and this elongated deformation is converted into rotational movement by means of a crankshaft.

The above structure with the crank mechanism, however, necessitates the use of multiple transducers, which imposes large cost and structural burdens. In addition, application of larger voltage is required for obtaining a larger amount of stroke (associated with the expansion of the dielectric elastomer), resulting in a significant decrease in durability. Accordingly, a structure with the crank mechanism must be of a short stroke type to keep the amount of stroke small, which may lead to undesired mechanical loss. Furthermore, undesirably the resulting torque may vary depending on the position of the crank in, for example, a stepping motor or servo motor that requires sufficient retention force in a stationary state.

In light of the foregoing, there is a demand for a motor with a dielectric elastomer to be capable of efficiently converting a small reciprocating movement to a rotational movement and to exert a sufficient retention force in a stationary state.

SUMMARY OF THE INVENTION

To solve the above problem, according to the present invention, use is made of a cam mechanism or a ratchet mechanism, for example, instead of using a conventional crankshaft.

According to the present invention, there may be provided a motor that includes a conversion mechanism that is capable of achieving a high driving force and a positional retention force by efficiently converting a small elongated deformation caused by the linear reciprocating movement of a dielectric elastomer to a rotational movement, while also being applicable to various applications by utilizing the characteristics of a flexible film. The resulting motor of the invention can be reduced in size, weight, and thickness to be flatter, and has small heat generation and low power consumption, as compared to a conventional motor using an electromagnetic force.

The inventors conceived the invention of a dielectric elastomer motor during a research and development on an artificial muscle using a dielectric elastomer, based on the idea that the dielectric elastomer would be usable for a motor converting the linear elongated deformation of the dielectric elastomer to rotational movement or motion even if the elongated deformation is small.

According to an aspect of the invention, there is provided a dielectric elastomer motor including: at least one artificial muscle; and a conversion mechanism. The artificial muscle includes: a film-like dielectric elastomer having a first surface and a second surface opposite to the first surface; first and second electrodes attached to the first surface and the second surface, respectively; and first and second bases attached to the dielectric elastomer and spaced apart from each other, where the first base and the second base are capable of reciprocating movement relative to each other by a change of size of the dielectric elastomer. The conversion mechanism is configured to convert the reciprocating movement to pivotal or rotational movement. The dielectric elastomer receives voltage application with a predetermined timing via the first and the second electrodes.

Preferably, the first and the second bases may be two plate-like members different in area, and the dielectric elastomer are spanned between the two plate-like members to form a frustum-shaped contour.

Preferably, the conversion mechanism may be a cam mechanism, and the cam mechanism may be a groove cam mechanism.

Preferably, the conversion mechanism may be a rack & pinion mechanism, or a free hub mechanism using a ratchet, or a contact mechanism using friction between a slider and a roller.

Preferably, the dielectric elastomer motor may further includes an additional artificial muscle, where the at least one artificial muscle and the additional artificial muscle are capable of receiving voltage application individually of each other.

Preferably, the conversion mechanism may include a pressing member, and the at least one artificial muscle and the additional artificial muscle are operatively coupled at different positions to the pressing member.

According to an aspect of the invention, the conversion mechanism includes a plurality of artificial muscles and an elliptical cam. The plurality of artificial muscles are provided at equal angular intervals in a direction vertical to the direction of a rotational shaft, and the elliptical cam is fixed to the rotational shaft, where one end of each artificial muscle is in contact with the cam. In this mechanism, each of the artificial muscles is provided with a voltage having a different phase, and the elongated deformation of the artificial muscle is converted to a movement in the rotational direction of the rotational shaft via the cam. The rotational speed is controllable by changing the cycle in which the voltage is varied.

The dielectric elastomer motor according to the present invention includes a conversion mechanism that achieves a high driving force and a positional retention force by efficiently converting the elongated deformation caused by the linear reciprocating movement of a dielectric elastomer to a rotational movement, and that is applicable to various applications by utilizing the characteristics of being substantially film-like and flexible. The dielectric elastomer motor can be reduced in size, weight, and thickness to be flatter, and has small heat generation and low power consumption, as compared to a conventional motor that uses an electromagnetic force.

The dielectric elastomer motor according to the present invention can be driven with a small amount of elongated deformation. This makes it possible to suppress the deterioration of the dielectric elastomer, which is a chief material of the present invention, and to extend the service life. Also, since the application voltage is low, other advantageous effects, such as lowering a risk of an electrical breakdown and suppressing the withstand voltage of a circuit, are also produced.

DESCRIPTION OF THE PREFERRED EMBODIMENTS

Figure 1:
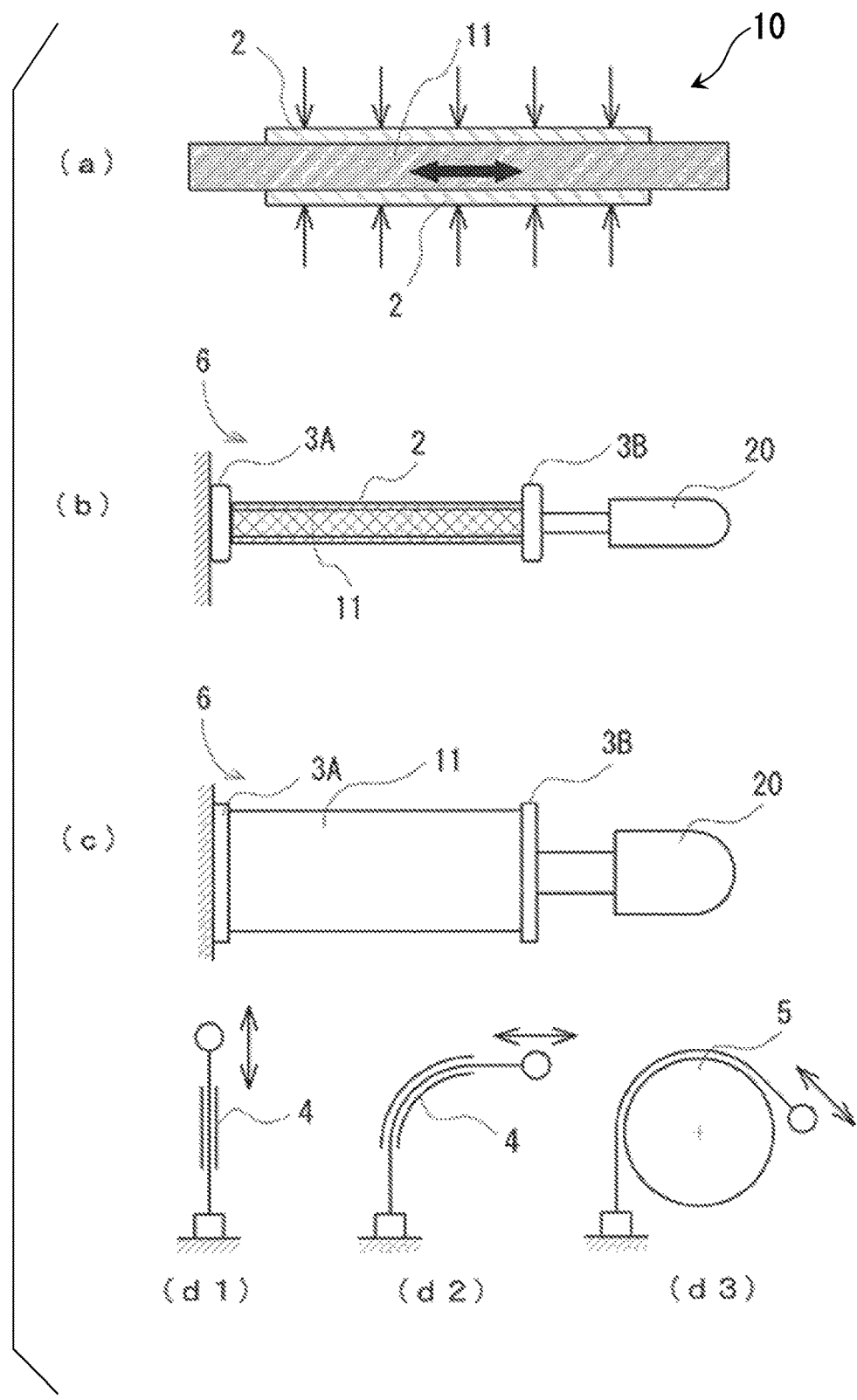
FIG. 1 shows a basic structure of an artificial muscle according to the present invention.

A dielectric elastomer motor of the present invention efficiently converts a reciprocating movement, which is caused by a linear and small elongated deformation of a substantially film-like dielectric elastomer 11, to a pivotal or rotational movement. The dielectric elastomer motor may be characterized by including a mechanism that converts the deformation of the flexible, film-like dielectric elastomer 11 into a desired movement. Though the following describes a dielectric elastomer motor with reference to the drawings, the embodiments shown in the drawings are merely examples, and any other specific embodiments may be conceived. Thus, it is to be noted that the technical scope of the present invention should not be limited to the following embodiments or the shapes and structures shown in the drawings, and may be modified appropriately without departing from the spirit of the present invention.

FIG. 1 shows a basic structure and basic operation of an artificial muscle 10 according to the present invention. Specifically, FIG. 1(a) shows the operational principle of the artificial muscle 10 that generates the driving force of the dielectric elastomer motor of the invention. FIG. 1(b) is a cross-sectional view showing a basic structure of a flat artificial muscle 6. FIG. 1(c) is a planar view of the flat artificial muscle 6 shown in FIG. 1(b). Each of these figures shows a basic structure for extracting output from the linear reciprocating movement between elongation and contraction of the dielectric elastomer 11. As shown in FIGS. 1(b) and 1(c), the artificial muscle 10 includes a film or layer-like dielectric elastomer 11, two electrodes 2 attached to both sides of the film, and bases 3 (3A, 3B) provided at both ends of the film.

FIGS. 1(d1) to 1(d3) schematically show the use of a guide 4 and a guide roller 5 to be used for dealing with various installation conditions. FIG. 1(d1) schematically shows a case where the thin flat artificial muscle 6 is used in a narrow flat gap. In particular, this structure allows the flat artificial muscle 6 to be installed in a narrow gap between adjacent structures. FIG. 1(d2) shows that the force by the elongated deformation is transmitted to a certain place by avoiding an obstacle, where the reciprocating movement of the artificial muscle is guided along a bending guide 4 to be transmitted to a conversion mechanism 8 (to be described later). FIG. 1(d3) shows a state where the artificial muscle makes a sharp angular change along the rotating guide roller 5 so as to transmit the reciprocating movement to the conversion mechanism 8.

Figure 2:
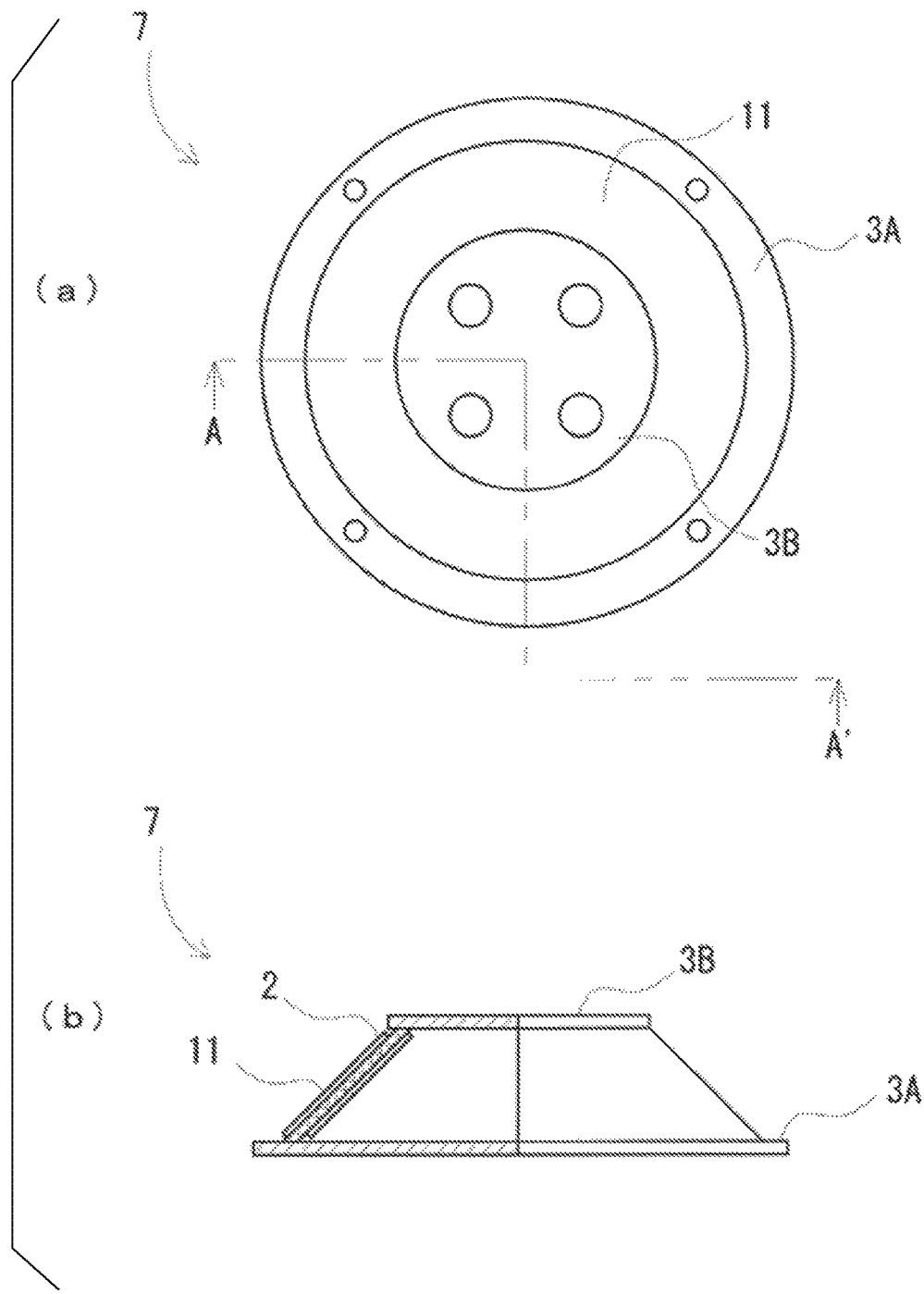
FIG. 2 shows a structure of a frustum-shaped artificial muscle according to the present invention.

FIG. 2 shows a structure where the artificial muscle of the invention is arranged between the bases 3A, 3B having different diameters. One end of the artificial muscle is attached around the periphery of a corresponding one base, while the other end of the artificial muscle is attached around the periphery of the other base, so that the illustrated artificial muscle 7 as a whole has a frustum shape (more precisely, the artificial muscle 7 has a frustum-shaped contour). FIG. 2(a) is a plan view of the frustum-shaped artificial muscle 7, and FIG. 2(b) is a front view of a single-sided cross section (A-A') of the frustum-shaped artificial muscle 7 shown in FIG. 2(b).

Figure 3:
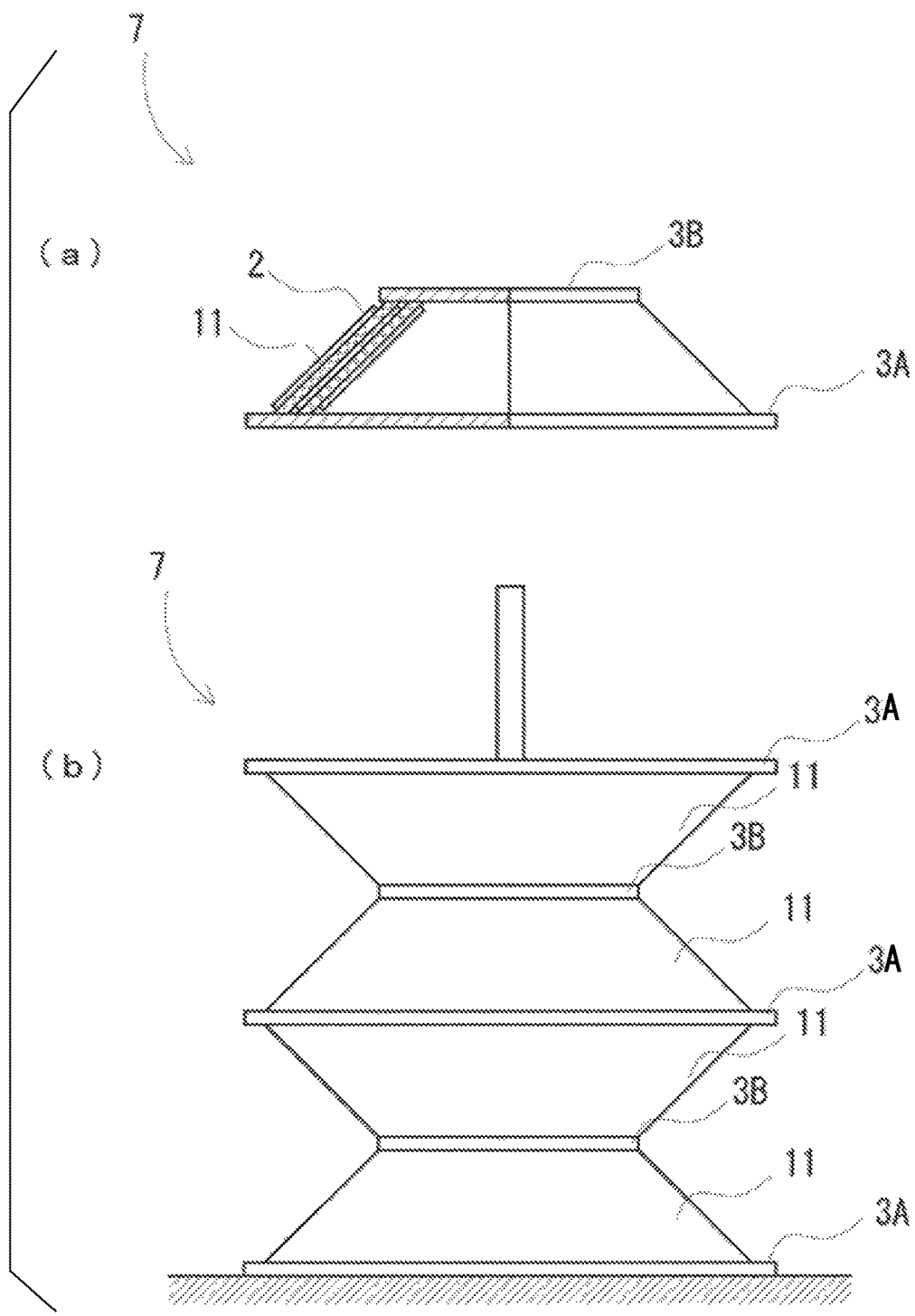
FIG. 3 shows structures including a plurality of dielectric elastomers according to the present invention.

FIG. 3 shows structures utilizing a plurality of dielectric elastomers 11, where FIG. 3(a) shows a structure with a plurality of dielectric elastomers 11 in a single frustum-shaped artificial muscle 7, and FIG. 3(b) shows a structure with four of such single frustum-shaped artificial muscles 7 that are coupled to each other. More specifically, FIG. 3(a) shows an example where the frustum-shaped artificial muscle 7 includes a pair of dielectric elastomers 11 having different pitch circle diameters, so that the inner dielectric elastomer 11 is accommodated in the outer dielectric elastomer 11. Note that the number of dielectric elastomers 11 may be further increased to provide a multi-layer structure. This allows for attaining a large output without increasing the amount of stroke of elongation between the bases 3. FIG. 3(b) differs from FIG. 3(a) in that the amount of stroke is increased between the bases 3 arranged at both outermost ends of the coupled frustum-shaped artificial muscles 7. Such a structure is employed in view of the above-noted problem (in order to obtain a large amount of power or elongation through the elongated deformation of the dielectric elastomer 11, a large voltage needs to be applied, which undesirably results in a decrease in durability).

Figure 4:
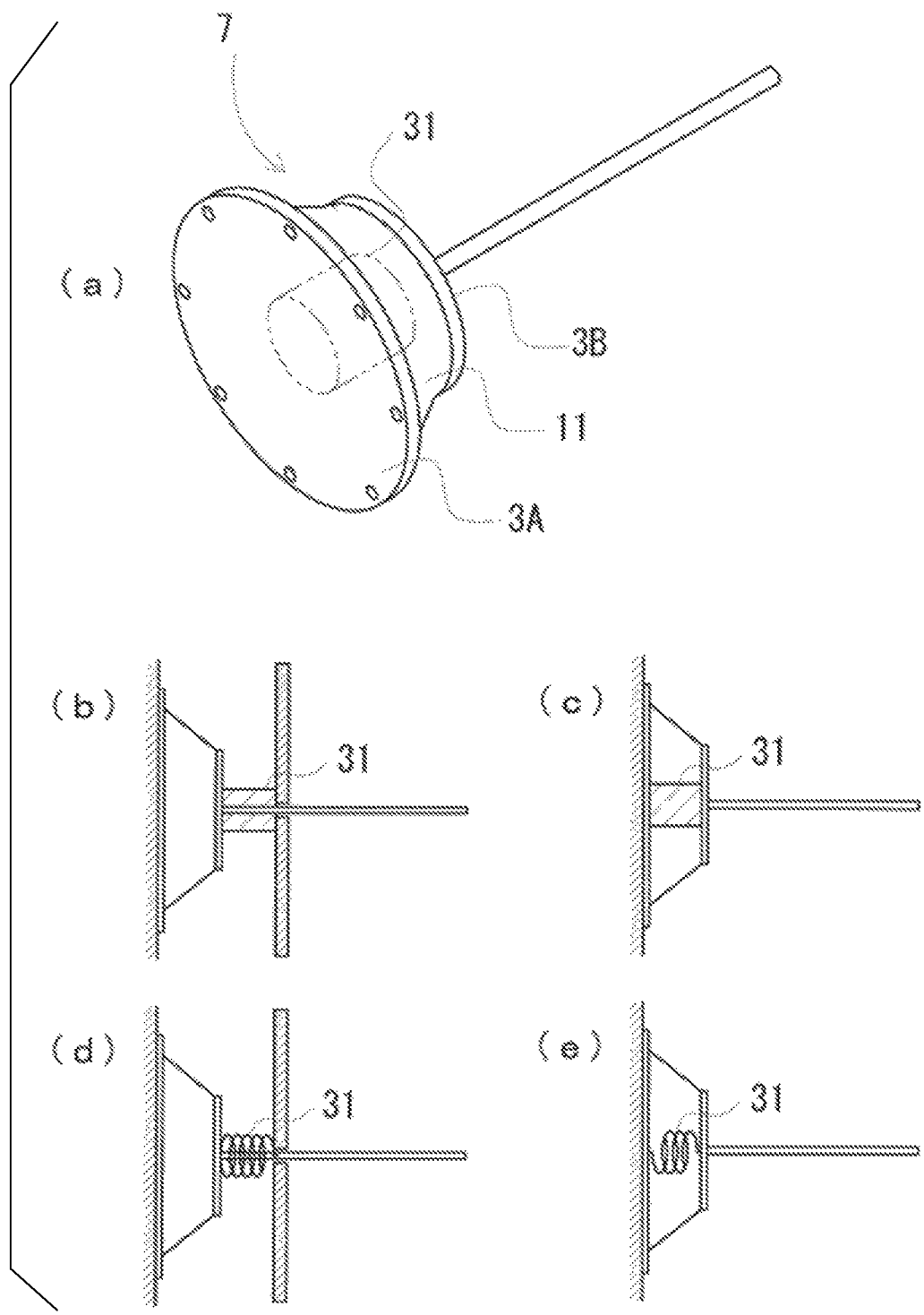
FIG. 4 shows an action of the frustum-shaped artificial muscle according to the present invention.

FIG. 4 shows the arrangements of an elastic member 31 when the artificial muscle of the invention is arranged to have a frustum shape for the dielectric elastomer motor 1. FIG. 4(a) is a perspective view showing an overall shape of the artificial muscle. FIG. 4(b) shows a structure where the elastic member 31 is arranged outside the dielectric elastomer 11. FIG. 4(c) shows a structure where the elastic member 31 is arranged inside the frustum-shaped dielectric elastomer 11 between two bases. FIG. 4(d) shows a structure where a coil spring is arranged outside the dielectric elastomer 11. FIG. 4(e) shows a structure where the elastic member 31, which in this example is a coil spring, is arranged inside the frustum-shaped dielectric elastomer 11 between two bases 3. When voltage is applied, with one of the bases 3 fixed in position, the dielectric elastomer 11 is elongated, and the other one of the bases 3, which is movable relative to the fixed base, is moved away from the fixed base. In order to return the movable base 3 to its original position, a reaction force is necessary, and this reaction force is provided by the elasticity of the elastic member 31. When the frustum-shaped structure is employed, various layouts are possible for the elastic member 31, as shown in the figures. Note that the application of larger voltage is required to generate a larger output, and the elastic member 31 therefore needs to have a correspondingly larger reaction force to return the movable base 3 to its original position. The frustum-shaped artificial muscle 7 allows the elastic member 31 to be freely arranged, either outside or inside the frustum-shaped artificial muscle 7. Also, in the case of a coil spring as shown in FIG. 4(d), an extension spring or a compression spring may be used suitably depending on the arrangements. Specifically, the extension spring may be used when arranged inside the artificial muscle 7 whereas the compression spring may be used when arranged outside the artificial muscle 7.

Figure 5:
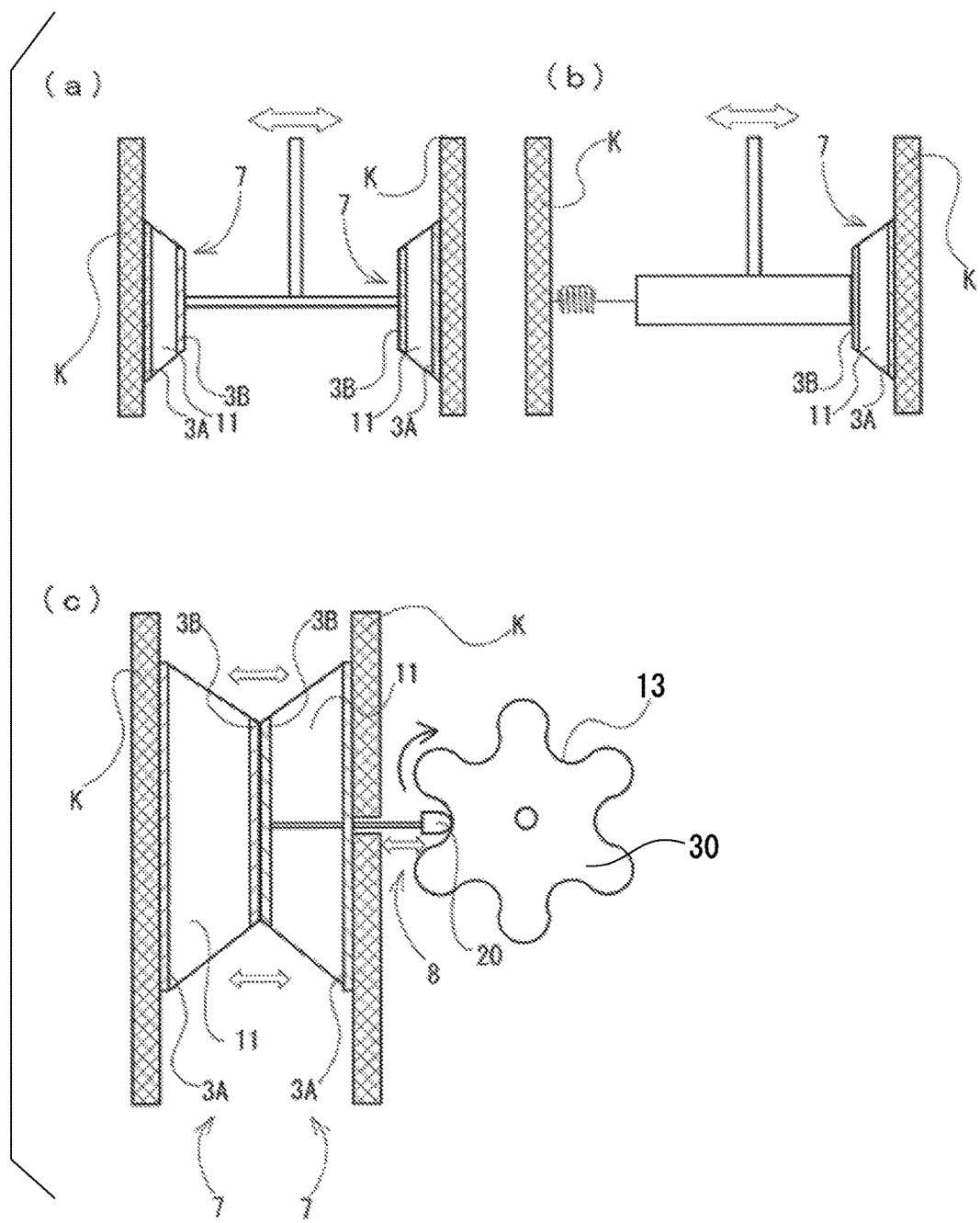
FIG. 5 shows examples of structures including a combination of a plurality of frustum-shaped artificial muscles according to the present invention.

FIG. 5 shows structures where a drive force is generated by the frustum-shaped artificial muscle 7. FIG. 5(a) shows a structure with two frustum-shaped artificial muscles 7 that are arranged to face each other, where they mutually repeat elongation and contraction to generate a drive force. FIG. 5(b) shows a structure with a single frustum-shaped artificial muscle 7, where it performs a similar operation to the operation shown in FIG. 5(a). FIG. 5(c) shows an overall structure where a linear movement is converted to a rotational movement by a cam mechanism. Specifically, a small linear reciprocating movement of the dielectric elastomer 11 causes a cam head 20 to repeatedly go in and out, thereby tracing the cam grooves 13. The contact between the cam head 20 and the cam grooves 13 causes a driven member 30 to rotate.

Figure 6:
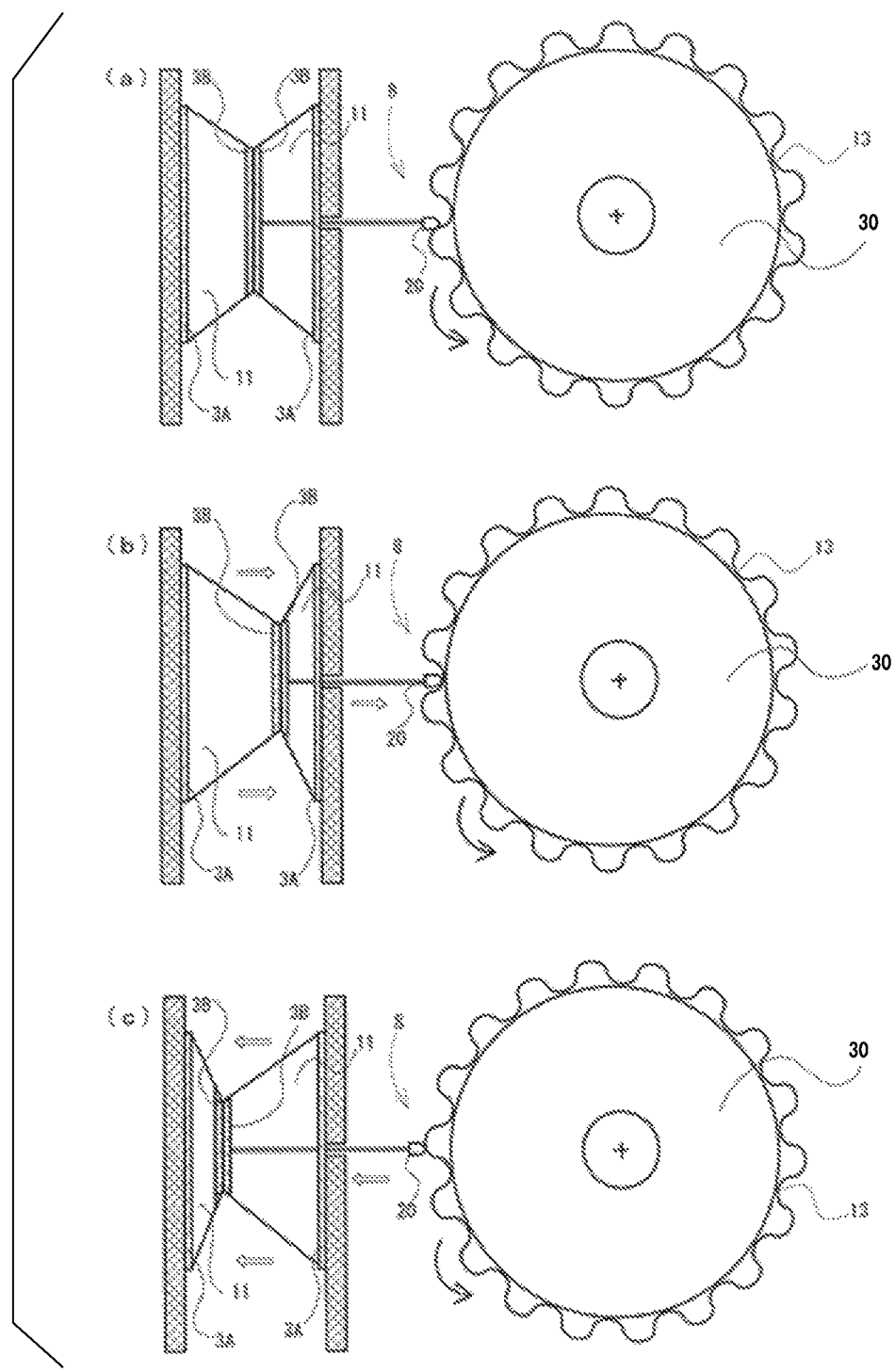
FIG. 6 shows a basic action using a cam mechanism, which is one of conversion mechanisms according to the present invention.

FIG. 6 shows a conversion mechanism with the frustum-shaped artificial muscles 7. FIG. 6 shows a simple operation with the cam head 20 to rotate the driven member 30. Regarding the conversion mechanism 8 shown in FIG. 6, two frustum-shaped artificial muscles 7 are paired up, movable bases 3B having a smaller diameter are abutted on each other, and fixed bases 3A having a larger diameter are fixed to walls or the like. The frustum-shaped artificial muscles 7 are deformed and elongated between the two walls. This causes the cam head 20 indicated between the dielectric elastomers 11 and the driven member 30 to repeatedly go in and out of the cam grooves 13 while tracing the cam grooves 13, and the contact between the cam head 20 and the cam grooves 13 causes the driven member 30 to rotate.

FIG. 6(a) shows two artificial muscles in a balanced state. FIG. 6(b) shows the state where the cam head 20 is pushed out. FIG. 6(c) shows the state where the cam head 20 is pulled in. In the balanced state shown in FIG. 6(a), the cam head 20 is positioned at an inclined portion of a cam groove 13. In FIG. 6(b), the cam head 20 is in contact with an area near the deepest part of the valley of the cam groove 13. In FIG. 6(c), the cam head 20 is in contact with an area near the ridge of the cam groove 13. The dielectric elastomer motor 1 can freely control the reciprocating movement through electric control, and therefore can continuously repeat the reciprocating movement to yield a rotation in a constant direction. The dielectric elastomer motor of the invention can control the cam head 20 such that when the cam head 20 makes contact with one of the inclined portions or valley of a cam groove 13, the cam head 20 retains the rotation at the position of contact. This makes it possible to obtain a rotational movement by continuously repeating a linear reciprocating movement even if the stroke of the artificial muscles is not sufficiently long.

In FIGS. 2 to 6, the frustum-shaped artificial muscle 7 including the dielectric elastomer 11 has a truncated conical shape. However, the frustum-shaped artificial muscle 7 may instead have a truncated pyramidal shape. In this case, a single dielectric elastomer 11 may form the truncated pyramidal shape or, alternatively, a plurality of dielectric elastomers 11 may form the truncated pyramidal shape where the dielectric elastomers 11 are arranged to form the periphery of the truncated pyramid, and are independently controlled to achieve a linear deformation and an angular deformation. Yet alternatively, many dielectric elastomers 11 may be used to forma polygonal truncated pyramidal shape or a substantially truncated conical shape to achieve a substantially circular swiveling movement. Though not shown, the frustum-shaped artificial muscle 7 including a truncated pyramidal or substantially truncated conical dielectric elastomer 11 is within the technical scope of the present invention.

Figure 7:
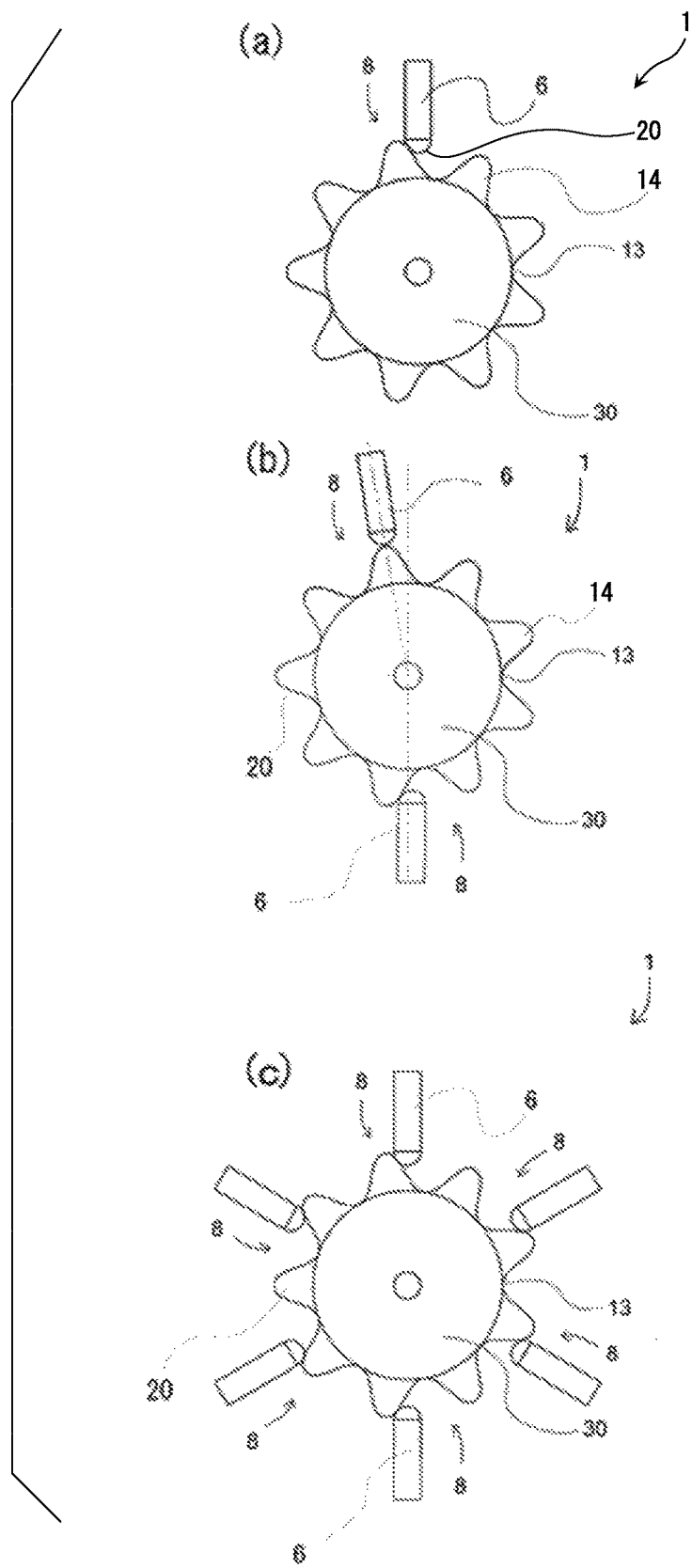
FIG. 7 shows a rotational movement of the cam mechanism according to the present invention.

FIG. 7 shows examples of use of the flat artificial muscle 6 according to the present invention. In the examples of FIG. 7, the dielectric elastomer motor 1 uses a cam mechanism as the conversion mechanism 8 that converts a linear movement to a rotational movement. FIG. 7(a) shows an operation with a single flat artificial muscle 6. FIG. 7(b) shows an operation with two flat artificial muscles 6. FIG. 7(c) shows an operation with many flat artificial muscles 6.

FIG. 7(a) shows the state at the initial actuation where an inclined portion of the cam head 20 (a pressing member of the flat artificial muscle 6) is in contact with an inclined portion of the cam groove 13. In this state, the initial push-and-pull operation in the reciprocating movement of the cam head 20 enables the driven member 30 to be rotated in a certain direction.

However, when only one flat artificial muscle 6 is used to move the cam head 20, as shown in FIG. 7(a), the rotational direction of the driven member 30 may not be started if the cam head 20 comes into contact with the bottom of the valley of the cam groove 13. In this case (with only a single muscle 6), the cam head 20 may not be able to rotate the driven member 30 with the push-and-pull operation. Accordingly, when using only one flat artificial muscle 6, it is desirable to devise the shape of the cam head 20 or the cam grooves 13 to ensure that a force always acts in one direction. For example, either or both of the cam head 20 or the cam grooves 13 may have an asymmetric shape. In the case of each cam groove 13, the right half of the cam groove 13 from the ridge 14 to the valley differs in shape from the left half of the cam groove 13 from the ridge 14 to the valley.

FIG. 7(*b*) shows a structure where two flat artificial muscles 6 are used. In this structure, when the cam head 20 of one flat artificial muscle 6 is located at either the ridge 14 (see the upper part of FIG. 7(*b*)) or valley of a cam groove 13, the other flat artificial muscle 6 is always in contact with an inclined surface (see the lower part of FIG. 7(*b*)) of another cam groove 13 which connects the ridge 14 and the valley. In the example shown in FIG. 7(*b*), one of the cam heads 20 is arranged to be slightly offset from the position opposite to the other cam head 20, and to have a phase difference with respect to the other cam head 20 by approximately half the period from the ridge 14 to the bottom of the valley of a cam groove 13. With such an arrangement, at least one of the two cam heads 20 can cause the driven member 30 to start rotating even from the initial stationary state.

FIG. 7(*c*) shows one example of the conversion mechanism 8 where many flat artificial muscles 6 are arranged for the driven member 30 and operate like a stepping motor. This structure increases a rotational force, improves a positional retention force, and facilitates an angular control as seen in conventional stepping motors. Also, in the structure where many flat artificial muscles 6 are arranged radially, the positional accuracy can be improved depending on the number of flat artificial muscles 6.

Although FIG. 7(*c*) shows the structure where six flat artificial muscles 6 are arranged for nine cam teeth, other structures are also possible. For example, the number of flat artificial muscles 6 may be selected so as to make contact with all cam grooves 13. For example, using nine flat artificial muscles 6 to make contact with all nine cam grooves 13 can increase power and improve accuracy in positioning and retention as compared to using six artificial muscles 6 as shown in FIG. 7(*b*).

Figure 8:
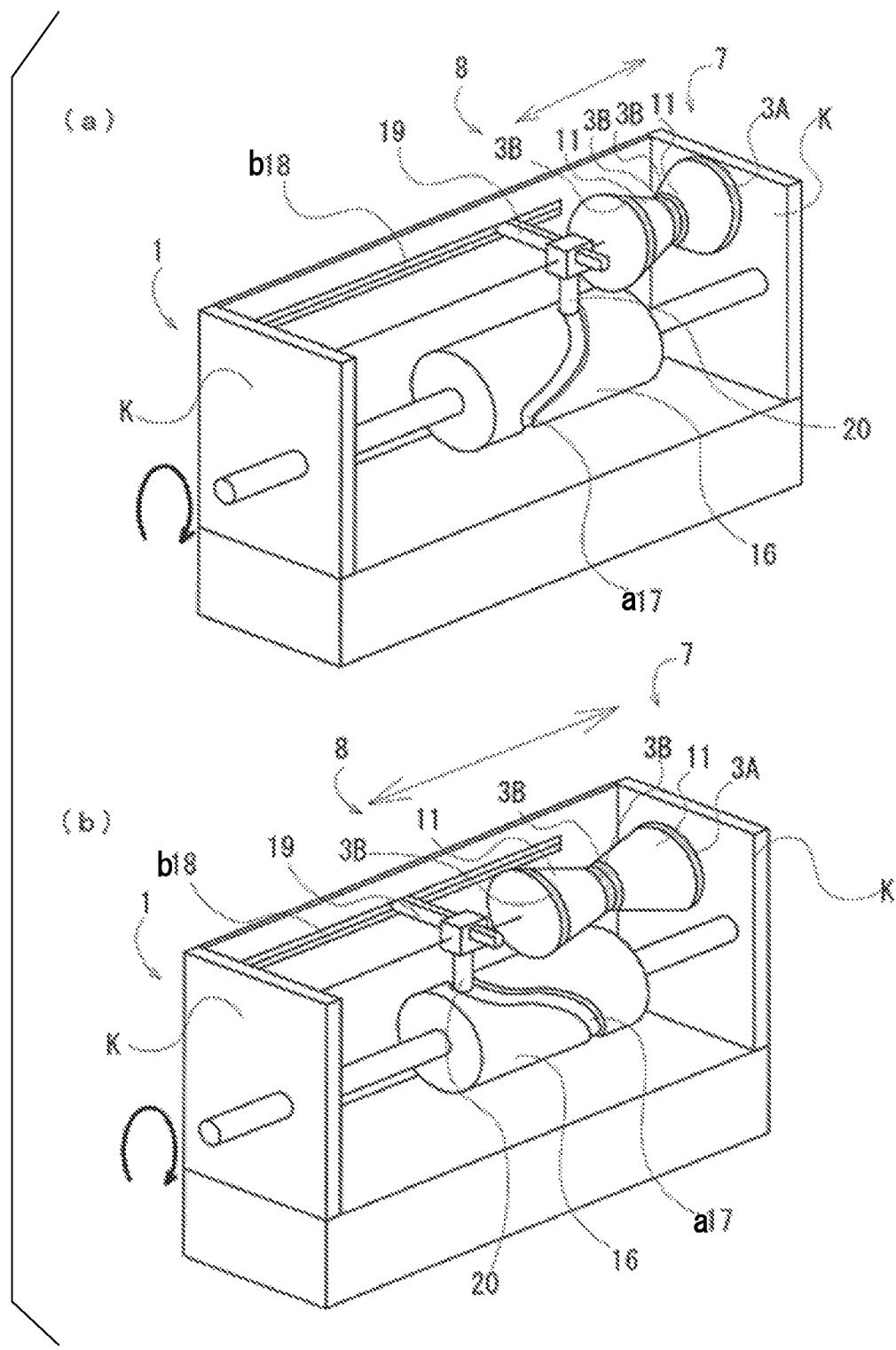
FIG. 8 shows an action using a cylindrical grooved cam mechanism, which is one of the conversion mechanisms according to the present invention.

The dielectric elastomer motor 1 can be made thin with use of the flat artificial muscle 6, or instead can be made three-dimensional with use of frustum-shaped artificial muscles 7 as shown in FIG. 8. FIG. 8 shows an example of using a cylindrical driven member 16 that serves as the conversion mechanism 8, with dielectric elastomers 11 being used for a three-dimensional structure. FIG. 8(*a*) shows the state where voltage is not applied, whereas FIG. 8(*b*) shows the state where voltage is applied to cause elongation. In this example, the cylindrical driven member 16 is driven with the frustum-shaped artificial muscles 7 arranged in series so as to increase the amount of elongation for a longer stroke. More specifically, in this structure, one end of the series of frustum-shaped artificial muscles 7 is fixed to a wall, and the elongated deformation of the frustum-shaped artificial muscles 7 is converted to a rotational movement. Also, in FIG. 8, the cylindrical driven member 16 is rotated by the cam head 20 that is driven to slide along a guide groove a17 provided in the circumference of the cylindrical driven member 16. When the frustum-shaped artificial muscles 7 are deformed and elongated, a slide guide 19 stably reciprocates along a guide groove b18.

Figure 9:
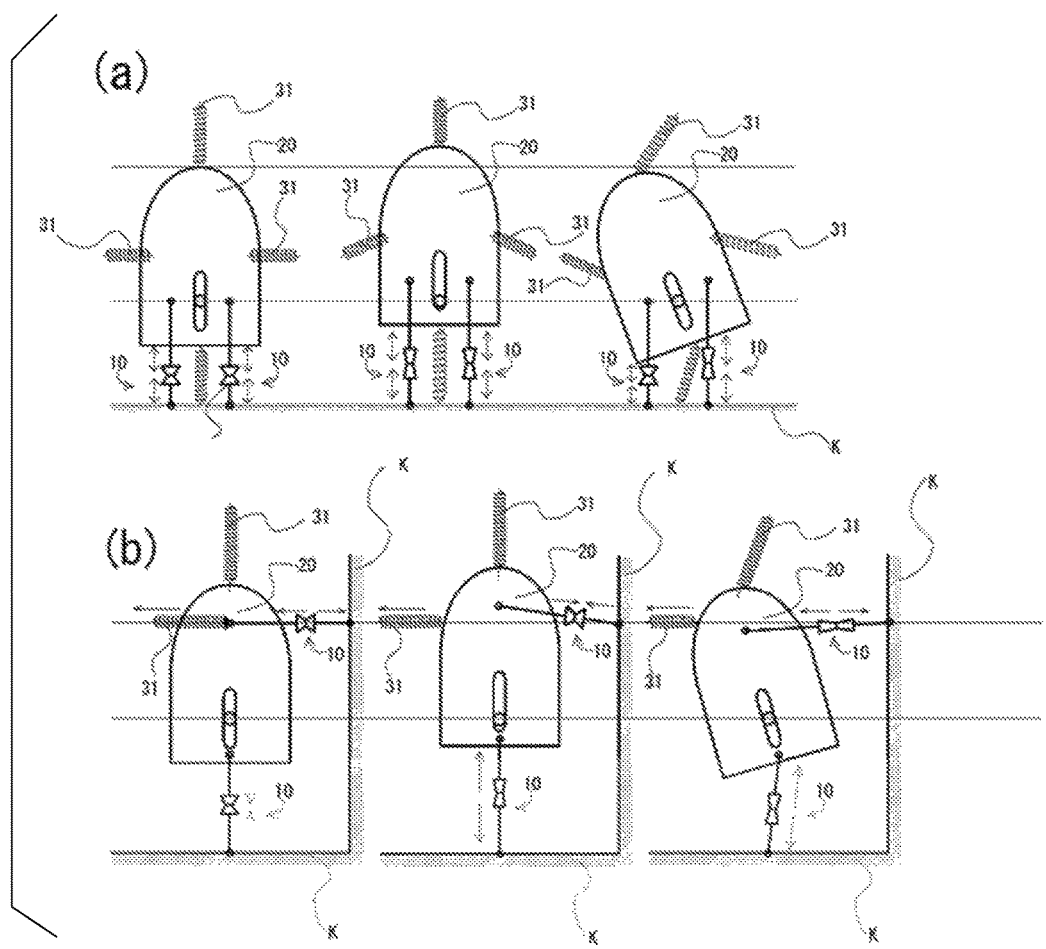
FIG. 9 shows the angular adjustment of a pressing member according to the present invention.

FIG. 9 shows an angular adjustment of a pressing member (such as cam head 20) according to the present invention. FIG. 9(*a*) shows two or more artificial muscles 10 that are arranged in parallel in a linear movement direction with respect to a fixed wall K and are operatively coupled to a pressing member (such as cam head 20), as noted below.

FIG. 9(*b*) shows a structure where one artificial muscle 10 is arranged in the linear movement direction, and another artificial muscle 10 is arranged in a direction perpendicular to the linear movement direction. In the structure shown in FIG. 9(*a*), the pressing member can be controlled so as to adjust its contact position (relative to an object to be driven by the pressing member) so as to ensure that the pressing is always performed at an appropriate angle.

FIG. 9(*a*) is divided in three parts, i.e., a left part, a middle part, and a right part, in each of which two artificial muscles 10 are arranged in parallel to perform a required operation. Specifically, in the left part, no voltage is applied to either of the two artificial muscles 10, and the artificial muscles 10 are in the most contracted state. Also, the elastic members 31 are provided to flank the pressing member or cam head 20 in a lateral direction. Thus, the cam head 20 is in a balanced state. In the middle part, the same voltage is applied to each of the two artificial muscles 10 to cause them to be in the most elongated state. Also, the elastic members 31 are provided so that the cam head 20 is in a balanced state in the lateral direction. In the right part, voltage is applied to one of the two artificial muscles 10 and no voltage is applied to the other artificial muscle 10. This causes a difference in the amount of elongated deformation which allows for an angular control. With this configuration, the cam head 20 can be in contact with a cam groove 13 without play. In addition, a front and back adjustment may be combined with the angular adjustment to provide a more complicated operational control for the cam head 20.

FIG. 9(*b*) is divided in three parts, i.e., a left part, a middle part, and a right part, in each of which one of the two artificial muscles 10 is provided in a vertical direction whereas the other is provided in a horizontal direction. In the left part, no voltage is applied to either of the artificial muscles 10 provided in the vertical direction and the horizontal direction. In the middle part, voltage is applied to the artificial muscle 10 in the vertical direction, and smaller voltage is applied to the artificial muscle 10 in the horizontal direction so as not to cause an angular change. In this way, the cam head 20 protrudes straight upward without any angular change in the vertical direction. In the right part, voltage is applied in both of the artificial muscles 10 in the vertical direction and the horizontal direction, so that the top of the cam head 20 does not move in the vertical direction and the cam head 20 only changes its angle. This structure as described above facilitates detailed operational control by accurately controlling the push-out amount of the cam head 20, the angle of the cam of the cam head 20, and so on.

Figure 10:
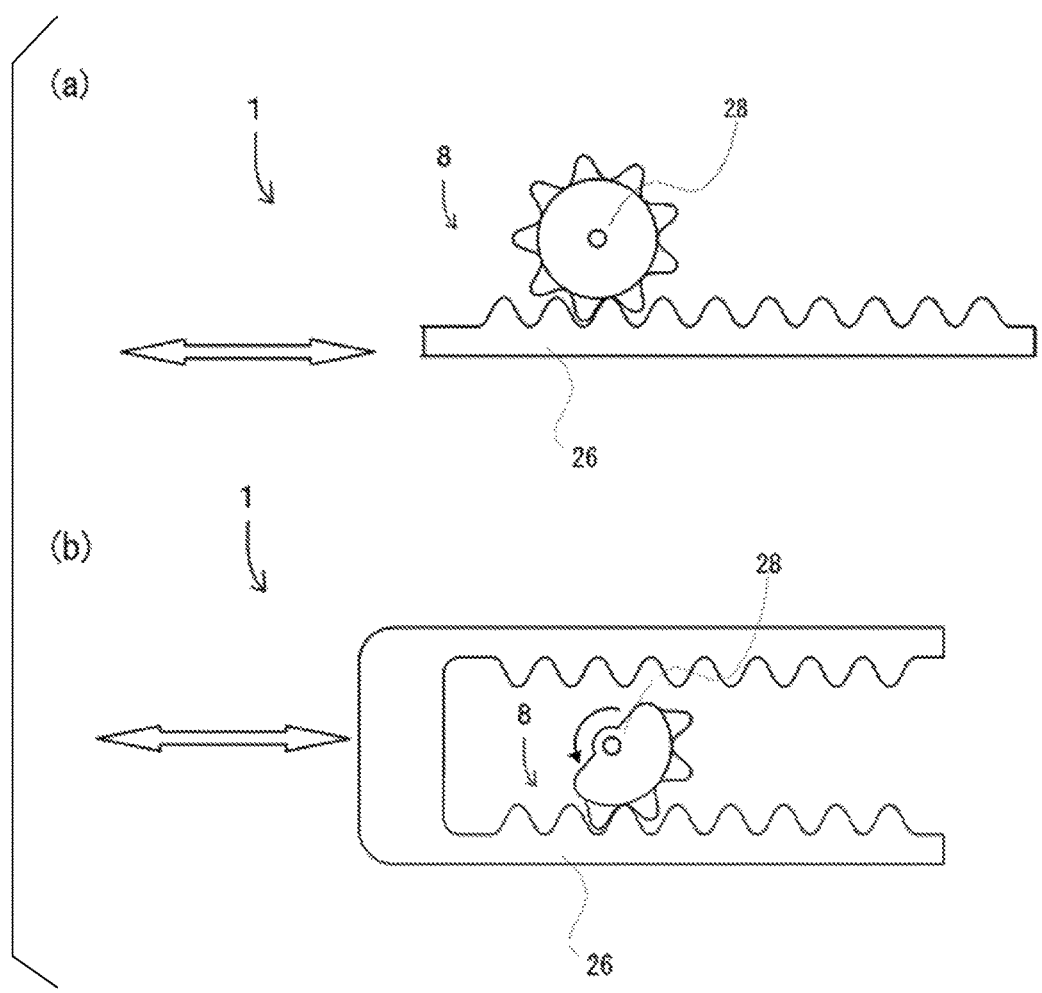
FIG. 10 shows an example using a rack-and-pinion structure according to the present invention.

FIG. 10 shows a rack-and-pinion structure that serves as the conversion mechanism 8 according to the present invention, where the linear reciprocating movement of a rack 26 causes a pinion gear 28 to turn or rotate back and forth at a predetermined angle. FIG. 10(*b*) shows a mechanism where two racks 26 sandwiching the pinion gear 28 are moved to thereby convert a continuous reciprocating movement to a continuous rotational movement in one direction. Although not shown, the rack 26 and the pinion gear 28 may be replaced with a slider and a roller (that come into mutual engagement) to provide a similar driving structure using contact friction.

Figure 11:
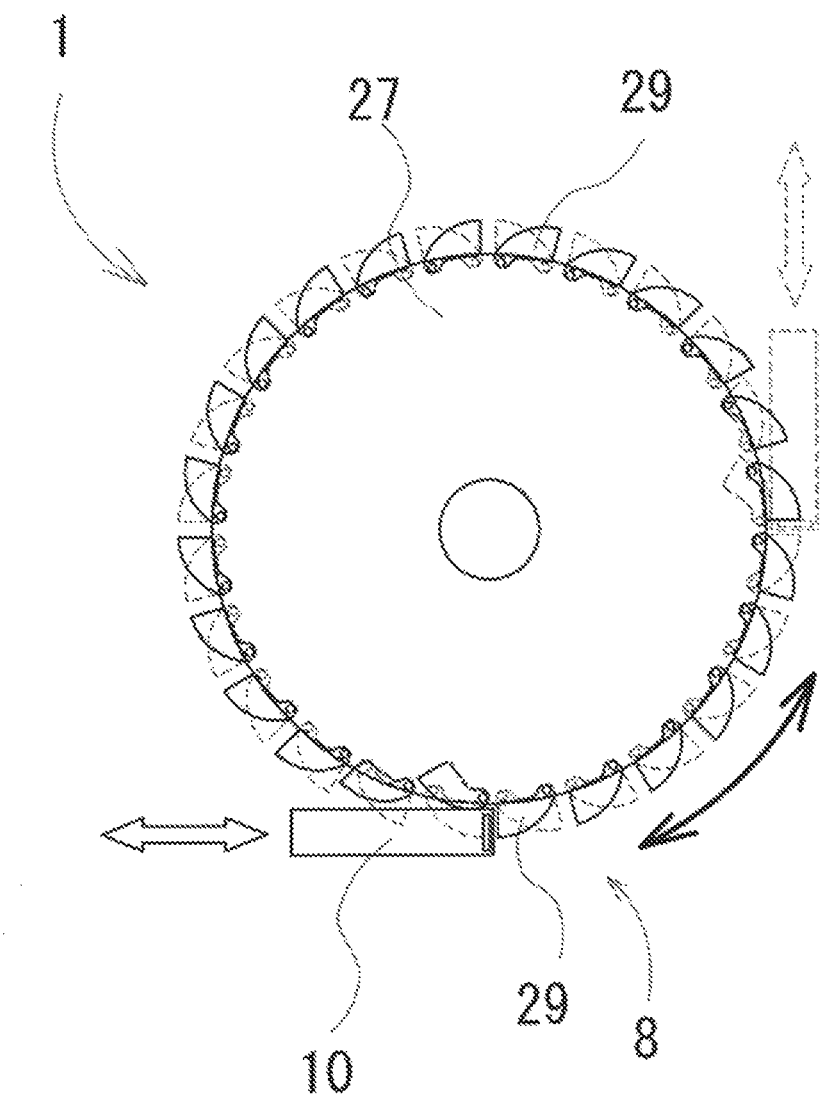
FIG. 11 shows an example using a free hub mechanism with a ratchet, which is one of the conversion mechanisms according to the present invention.

FIG. 11 shows a free hub that serves as the conversion mechanism 8. The illustrated free hub utilizes a ratchet mechanism, though the present invention is not limited to this. As shown in FIG. 11, the circumference of a rotor 27, which is a rotating member, is provided with a plurality of ratchet teeth 29 that can transmit power in only one rotational direction. These ratchet teeth 29 are pressed by the artificial muscle 10 in a direction of transmitting rotational power to generate a drive force.

The above mechanism may include two ratchets that rotate in different directions and two corresponding artificial muscles 11 so as to achieve forward and reverse rotations. More specifically, FIG. 11 shows two rows of ratchet teeth 29 having opposite orientations around the circumference of the rotor 27. A first row of ratchet teeth 29, which is shown closer toward the front in the figure, is indicated by a solid line, and a second row of ratchet teeth 29, which is oriented differently from the first row of ratchet teeth 29, is indicated by a dashed line. In other words, a plurality of ratchet mechanisms for regulating rotational directions allow for switching between a forward rotation and a reverse rotation.

Figure 12:
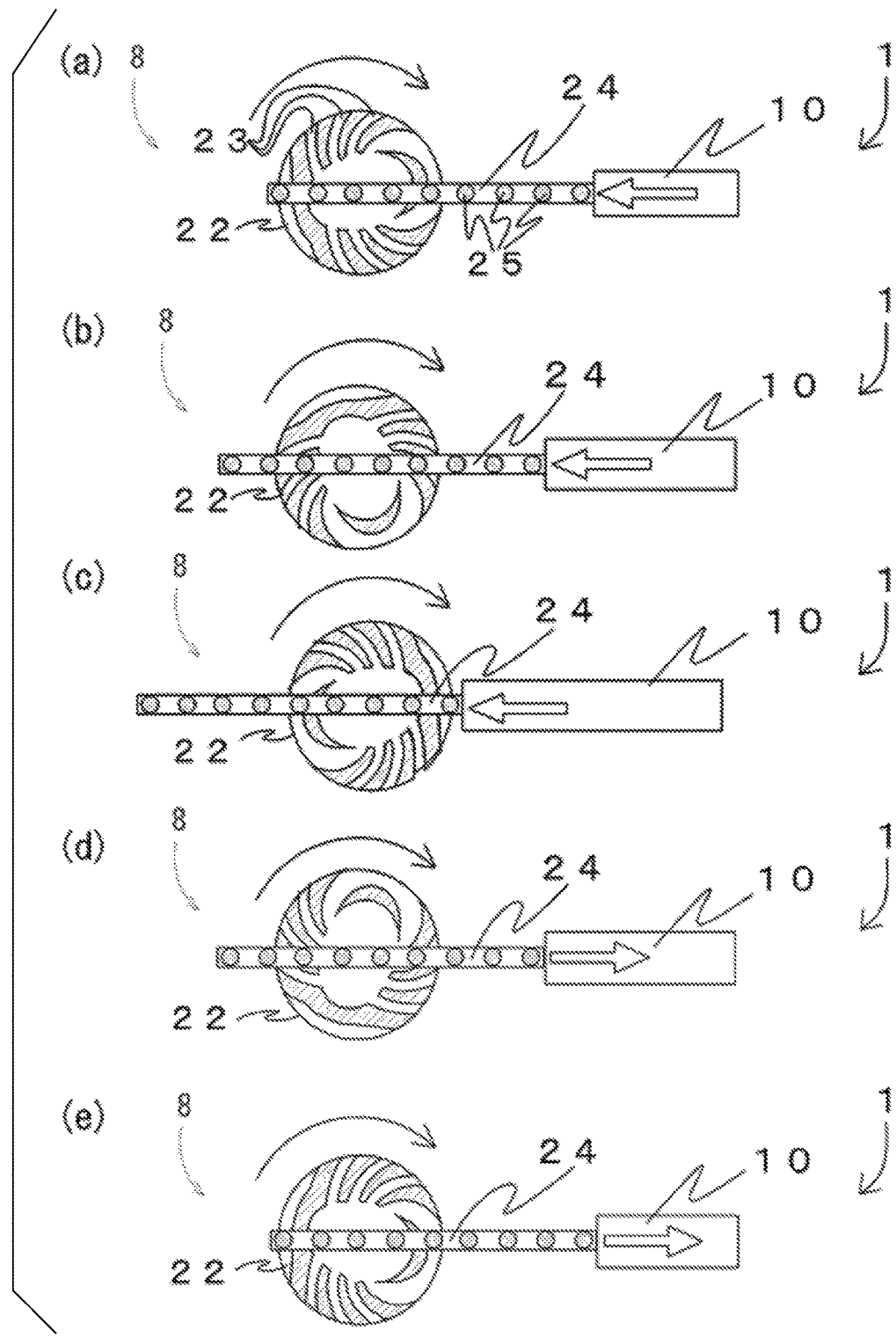
FIG. 12 shows an example using a pick-and-place mechanism, which is one of the conversion mechanisms according to the present invention.

FIG. 12 shows a kind of pick-and-place mechanism that serves as the conversion mechanism 8. The conversion mechanism 8 shown in FIGS. 12(a) to 12(e) includes a grooved rotational disc 22 having a plurality of curved grooves 23, and a slide plate 24 having a plurality of protrusions 25 along a straight line. This mechanism converts a continuous linear movement to a continuous rotational movement by any of the protrusions 25 being always pressed into and in contact with a corresponding one of the grooves 23 in a rotational direction.

Figure 13:
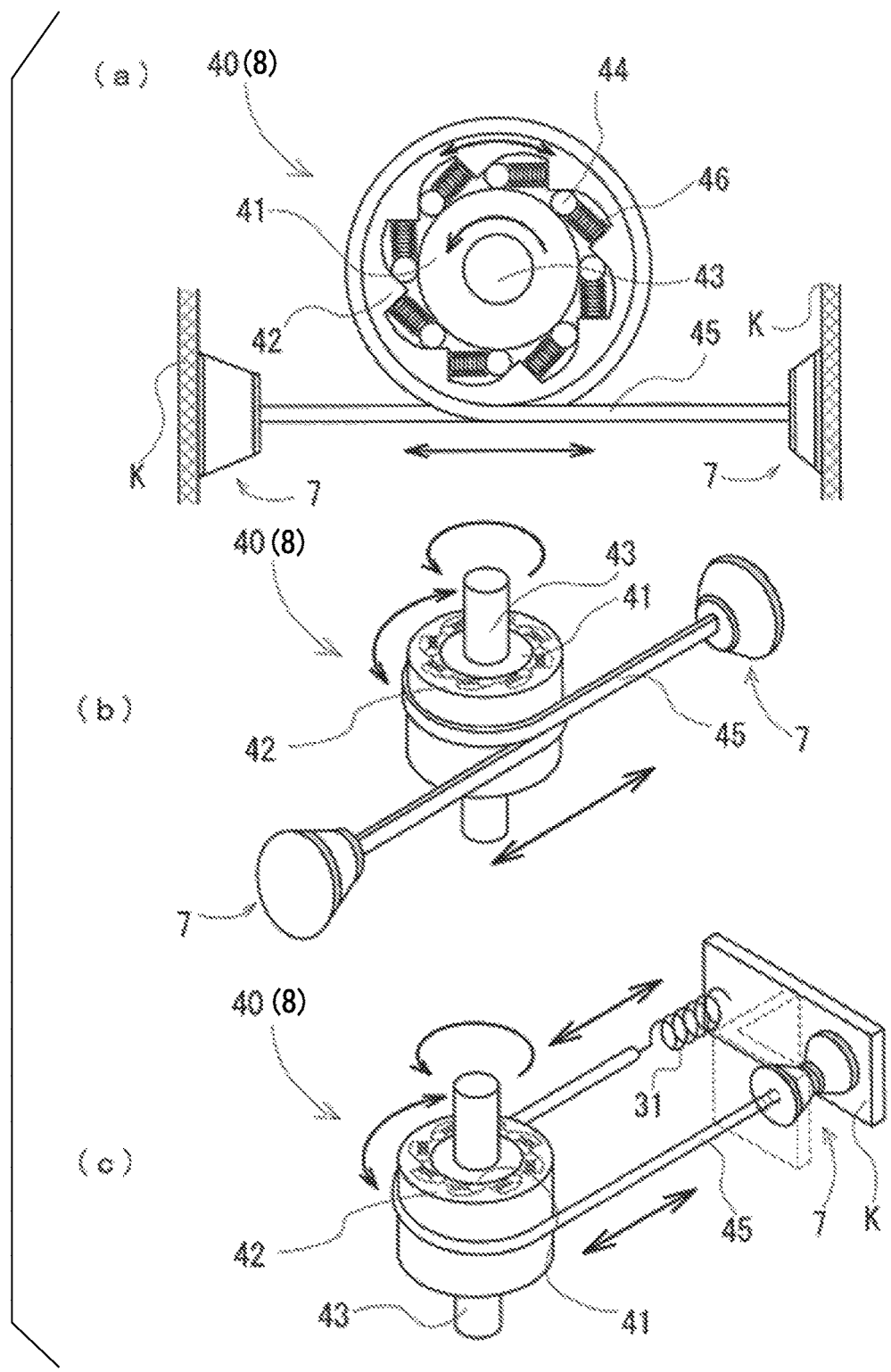
FIG. 13 shows structures using a one-way mechanism, which is one of the conversion mechanisms according to the present invention.

FIG. 13 shows a one-way mechanism 40 that serves as the conversion mechanism 8. Specifically, FIG. 13(a) shows a structure of the one-way mechanism 40, and FIGS. 13(a), 13(b), and 13(c) show the arrangement of a belt 45 for transmitting a rotational force converted from a drive force. This drive force is generated by the linear one-way movements of the frustum-shaped artificial muscles 7. Note that the frustum-shaped artificial muscles 7 shown in FIG. 13 may be replaced with the flat artificial muscles 6. However, application of high voltage to increase elongation will lower the durability. Accordingly, it is beneficial to include the dielectric elastomer 11 in the frustum-shaped artificial muscle 7 as shown in FIG. 13, so that a sufficient amount of elongation is ensured to achieve a desired amount of stroke even with a low application voltage.

Specifically, the one-way mechanism 40 is configured to transmit power when the contact-surface pressure between an outer roller 42 and an inner roller 41 increases in one rotational direction by a ball 44 pressured by an elastic member 46 (e.g., a spring), and is configured to stop transmitting power when the contact pressure therebetween decreases in the other rotational direction.

In order to convert a reciprocating movement to a rotational movement with the one-way mechanism 40, a transmission structure for transmitting the elongation of the artificial muscle 10 is necessary. In the conversion mechanism 8 shown in FIG. 13(a), two frustum-shaped artificial muscles 7 are used to as the artificial muscles 10, and a belt 45 is used to connect the two frustum-shaped artificial muscles 7 and the one-way mechanism 40.

In FIG. 13(a), the belt 45 is in the form of a string or a strip, but it is not limited to having such a shape or a type. For example, in a case where a sprocket is provided around the outer circumference of the outer roller 42 of the one-way mechanism 40, the belt may take the form of a chain. Alternatively, the belt 45 may take the form of a timing belt in a case where projections and recesses for the timing belt are provided around the outer circumference of the outer roller 42 of the one-way mechanism 40. Furthermore, the conversion mechanism 8 may have a structure with a pinion gear, a rack gear 26, and the artificial muscles 10 (frustum-shaped artificial muscles 7 in the examples shown in FIGS. 13(a) and 13(b)). The pinion gear is provided around the outer circumferential edge of the outer roller 42 of the one-way mechanism 40. The artificial muscles 10 are provided at both ends of the rack gear 26. In this structure, voltage is applied alternately between these artificial muscles 10 so that only one of the artificial muscles 10 receives voltage at a time to cause a reciprocating movement. In other words, it is desirable to select the optimal type of the belt 45 according to the application. Another structure similar to the above structures is, although not shown, a combination of a planetary gear mechanism and the belt 45. This combination is useful since it has a relatively small mechanical loss.

Note that a structure including an outer case to cover the dielectric elastomer motor 1 that uses the artificial muscle 10 is not shown in any of the attached figures. This is because such an outer case is not necessary if the fixed base 3A and the movable base 3B can be fixed to both a driven member intended to be directly driven and a fixed member which for example pushes the driven member, using adhesive, bonding, or a screwing member. However, it is possible to include an outer case to enhance versatility.

The dielectric elastomer motor 1 of the invention has a great industrial applicability as it can replace an existing motor used in a device such as: a wearable hemostasis device having an air-cooling and/or medical adjustment function; a pressuring part of a sphygmomanometer that applies pressure to an arm; an electric bicycle; an electric car; an electric aircraft; a helicopter; and a robot, as well as actuators using compressed air.

The invention claimed is:

1. A dielectric elastomer motor comprising: at least one artificial muscle; and a conversion mechanism, wherein the artificial muscle comprises: a film-like dielectric elastomer having a first surface and a second surface opposite to the first surface; first and second electrodes attached to the first surface and the second surface, respectively; and first and second bases attached to the dielectric elastomer and spaced apart from each other, the first base and the second base being capable of reciprocating movement relative to each other by a change of size of the dielectric elastomer, the conversion mechanism is configured to convert the reciprocating movement to pivotal or rotational movement, the dielectric elastomer receives voltage application with a predetermined timing via the first and the second electrodes, and the conversion mechanism comprises:
an inner roller;
an outer roller having a common axis shared by the inner roller; and
an elongated force transmission member held in contact with at least a part of an circumference of the outer roller, the force transmission member having a first end and a second end opposite to the first end,
the first end of the force transmission member being attached to one of the first base and the second base of the artificial muscle,
the outer roller being rotatable about the common axis in a forward direction and a backward direction upon movement of the force transmission member, and
the inner roller being rotatable about the common axis only when the outer roller is rotated in a selected one of the forward direction and the backward direction.

2. The dielectric elastomer motor according to claim 1, wherein the first and the second bases comprise two plate-like members different in area, and the dielectric elastomer spans between the two plate-like members to form a frustum-shaped contour.

3. The dielectric elastomer motor according to claim 1, further comprising an additional artificial muscle, wherein the at least one artificial muscle and the additional artificial muscle are capable of receiving voltage application individually of each other.

4. The dielectric elastomer motor according to claim 1, further comprising an elastic member, wherein the second end of the force transmission member is attached to the elastic member.

5. The dielectric elastomer motor according to claim 4, wherein the elastic member comprises a coil spring.

6. The dielectric elastomer motor according to claim 4, further comprising a fixed member, wherein the fixed member is fixed in position relative to the common axis so that a distance between the fixed member and the common axis is invariable, and wherein the artificial muscle and the elastic member are attached to the fixed member.

7. The dielectric elastomer motor according to claim 6, wherein the fixed member has a flat surface to which the artificial muscle and the elastic member are attached, and wherein the common axis extends in parallel to the flat surface of the fixed member.

8. The dielectric elastomer motor according to claim 1, wherein the force transmission member is held in the circumference of the outer roller in a manner such that the force transmission member makes a complete turn about the common axis.

9. The dielectric elastomer motor according to claim 8, further comprising an additional artificial muscle, wherein the second end of the force transmission member is attached to the additional artificial muscle.

10. The dielectric elastomer motor according to claim 9, further comprising a first fixed member and a second fixed member that are spaced apart from each other in a direction perpendicular to the common axis, wherein said at least one artificial muscle is attached to the first fixed member, and the additional artificial muscle is attached to the second fixed member.

11. The dielectric elastomer motor according to claim 1, wherein the conversion mechanism comprises a plurality of power transmission elements disposed around the common axis, and each of the power transmission elements comprises an elastic member and a ball, the elastic member having mutually separated first end and second end, the first end being fixed to the outer roller, the second end being fixed to the ball, wherein the ball is held in sliding contact with the inner roller.

12. The dielectric elastomer motor according to claim 11, wherein the outer roller comprises an inner circumferential surface that faces the inner roller and is formed with a plurality of recesses, each of the plurality of recesses accommodates a corresponding power transmission element of the plurality of power transmission elements, each of the plurality of recesses comprises a flat surface and a curved surface, the first end of the elastic member of the corresponding power transmission element being fixed to the flat surface, the curved surface extending from an end of the flat surface and about the common axis, the ball of the corresponding power transmission element being held in sliding contact with at least a part of the curved surface.

13. The dielectric elastomer motor according to claim 12, wherein the curved surface of each of the plurality of recesses comprises a first end and a second end that are separated from each other circumferentially of the common axis, the first end being closer to the flat surface of said each of the plurality of recesses than is the second end, wherein a distance between the second end of the curved surface and an outer circumferential surface of the inner roller is smaller than a distance between the first end of the curved surface and the outer circumferential surface of the inner roller.

14. The dielectric elastomer motor according to claim 13, wherein the ball of each of the power transmission elements has a diameter that is greater than the distance between the second end of the curved surface and the outer circumferential surface of the inner roller.

\* \* \* \* \*